Aug. 11, 1942.  E. A. EASTMAN  2,292,872
DOUBLE HINGE TILTING ARBOR SAW
Filed July 10, 1940  2 Sheets-Sheet 1

Elwyn A. Eastman
INVENTOR

BY Victor J. Evans & Co.
ATTORNEYS

Aug. 11, 1942.  E. A. EASTMAN  2,292,872
DOUBLE HINGE TILTING ARBOR SAW
Filed July 10, 1940  2 Sheets-Sheet 2
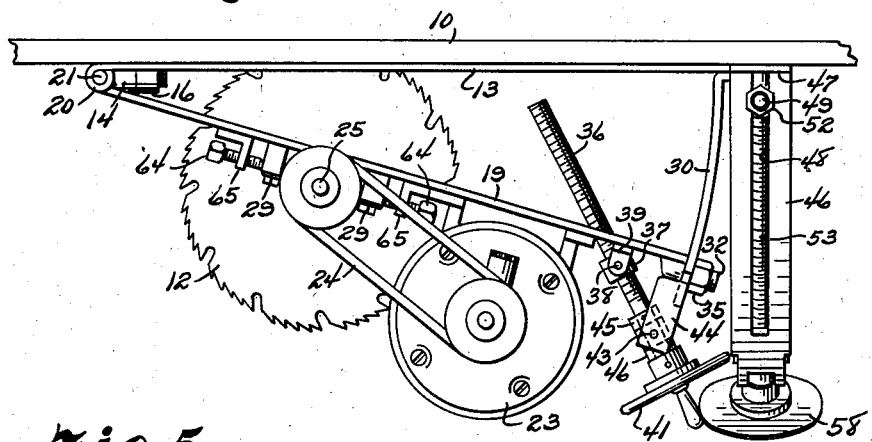
Elwyn A. Eastman
INVENTOR
BY Victor J. Evans & Co.
ATTORNEYS Patented Aug. 11, 1942

2,292,872

UNITED STATES PATENT OFFICE 2,292,872

DOUBLE HINGE TILTING ARBOR SAW

Elwyn A. Eastman, Seattle, Wash.

Application July 10, 1940, Serial No. 344,805

3 Claims. (Cl. 143—36)

This invention relates to a double hinge tilting arbor saw and has for an object to provide a circular saw adapted to extend through a slot in a table and which may be raised or lowered and tilted with reference to the table for sawing to different depths or at different angles.

A further object is to provide a saw of this character which may be adjusted by simple means, and in which the long arc of the tilting adjustment means facilitates an accurate setting of the saw.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 4 is a side elevation of the saw similar to Figure 1, but showing the saw in withdrawn position.

Figure 5 is an end elevation of the saw similar to Figure 3, but showing the saw tilted to an angle.

Figure 6 is a plan view of the leaf which is hinged at one longitudinal edge to the table to tilt the saw.

Figure 7 is a detail cross sectional view taken on the line 7—7 of Figure 6 showing a pivoted nut.

Figure 8 is a plan view of the leaf which is hinged at one end to the leaf shown in Figure 6 and carries the motor and the saw through an arc to provide for sawing to different depths.

Figure 2:
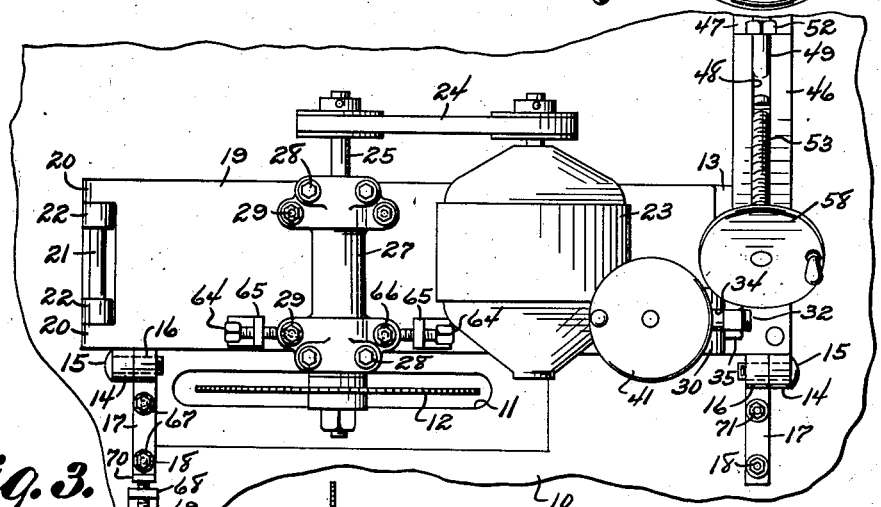
Figure 2 is a bottom plan view of the saw shown in Figure 1.

Referring now to the drawings in which like characters of reference designate similar parts in the various views, 10 designates a table having a longitudinal slot 11 therein, as best shown in Figure 2, to receive a circular saw 12.

In carrying out the invention an upper leaf 13, formed of sheet metal of substantially oblong shape as shown in Figure 6 is provided at one longitudinal edge with hinge lugs 14 adapted to receive hinge pintles 15 carried by hinge lugs 16 which are formed integral with bars 17 which extend along the underneath face of the table laterally of the longitudinal slot 11 and are secured to the table by bolts 18.

A lower leaf 19 formed of sheet metal of substantially oblong shape as shown in Figure 8 is provided at one end edge with hinge lugs 20 adapted to receive hinge pintles 21 carried by hinge lugs 22 which project downwardly from one end of the upper leaf 13 to hingedly secure the lower leaf to swing upwardly and downwardly below the table 10 from the upper leaf 13.

An electric motor 23 is secured to the underside of the lower leaf 19 in any preferred manner and is connected by a belt drive 24 to the shaft or arbor 25 of the circular saw 12. The arbor is mounted in a tubular bearing bracket 27 which is secured to the lower leaf by pairs of bolts 28 and 29 at each end which will be hereinafter more fully described.

An arcuate slotted guide arm 30 is provided at the upper end with a foot 31 which is secured to the underneath face of the upper leaf 13 by bolts 32 as shown in Figure 6. A threaded stud 33 extends from the free end of the lower leaf 19 and projects through the slot 34 in the arm 30. A nut 35 is threaded onto the threaded stud and is tightened against the arm 30 to hold the lower leaf 19 at any angular inclination to the upper leaf 13 and thus control the depth of the cut made by the saw 12. By virtue of the long length of the guide arm 30 a very accurate setting of the saw may be attained.

Figure 1:
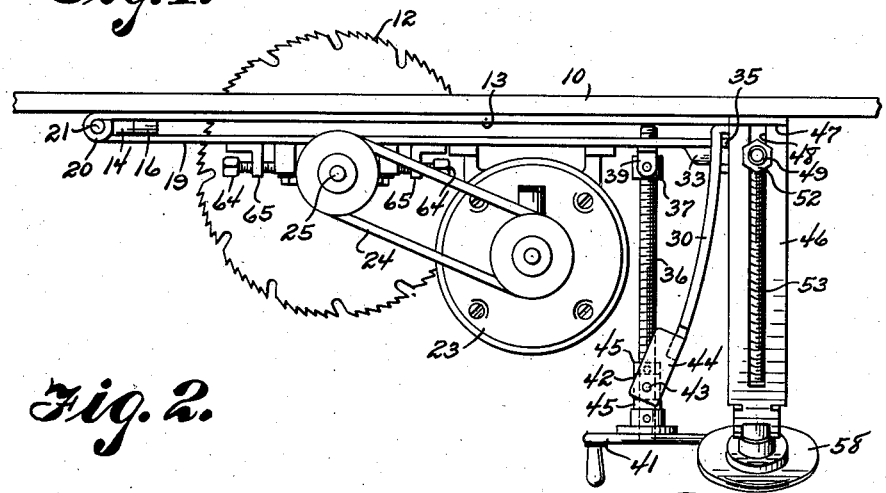
Figure 1 is a side elevation of a double hinge tilting arbor saw constructed in accordance with the invention.

For adjusting the lower leaf 19 upwardly and downwardly a feed screw 36 is provided with a travelling nut 37 having gudgeons 38 which are received in ears 39 which are secured to the underneath face of the lower leaf 19, as best shown in Figures 1, 4 and 8, to pivotally mount the travelling nut on the lower leaf. The top of the feed screw is engaged through a slot 40 in the lower leaf 19 when the lower leaf is disposed substantially parallel with the upper leaf 13, as shown in Figure 1. To feed the travelling nut downwardly on the feed screw to rock the lower leaf 19 downwardly to extend at an angle to the upper leaf, as shown in Figure 4, the feed screw is equipped with a hand wheel 41, and is rotatably mounted in a pivoted bearing nut 42 which is provided with gudgeons 43 which are engaged in openings in ears 44, shown in Figures 1, 4 and 6, and which extend from the arcuate guide arm 30. Stop collars 45 are secured to the feed screw above and below the nut 42. When the hand wheel is turned the nut 42 rocks on its gudgeons 43 to permit the feed screw to assume an angular position with respect to the lower leaf 19 and permit the travelling nut 37 to move from the position shown in Figure 1 to the position shown in Figure 4, or to any intermediate position on the feed screw, for withdrawing the saw 12 from the slot 11 in the table to vary the width of the cut.

Figure 3:
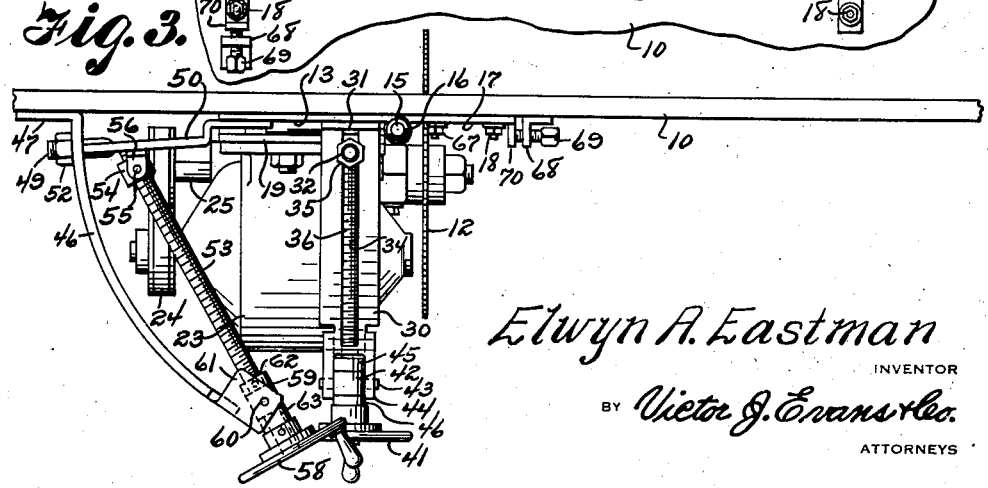
Figure 3 is an end elevation of the saw looking from the right of Figure 1.

For varying the angle of the cut made by the saw the upper leaf 13 may be rocked on the longitudinally disposed hinge pintles 15 from the position shown in Figure 3 to the position shown in Figure 5. For this purpose an arcuate guide arm 46 is provided at the upper end with a foot 47 which is secured to the underneath face of the table 10 in any preferred manner. The guide arm is provided with a longitudinal slot 48 which slidably receives a threaded stud 49 carried by a plate 50, best shown in Figure 6, which is bolted at one end as shown at 51 to one end of the upper leaf 13 and extends at a right angle to the leaf. A nut 52 is engaged on the end of the threaded stud 49 and is tightened against the arcuate guide arm 46 to lock the upper leaf 13 in any desired adjusted position of its angular pivotal movement downwardly from the table to a limit angle of about forty-five degrees in order to cant the saw 12 through the slot 11 at any desired angle to the table 10.

For adjusting the upper leaf in a downward direction with relation to the table, a feed screw 53 is provided with a travelling nut 54 having gudgeons 55 which are received in ears 56 carried by the plate 50, as best shown in Figures 3, 5 and 6 to pivotally mount the travelling nut on the upper leaf 13. The feed screw 53 is engaged through a slot 57 in the plate 50. To feed the travelling nut downwardly on the feed screw to rock the upper leaf 13 downwardly the feed screw is equipped with a hand wheel 58 and is rotatably mounted in a pivoted bearing nut 59 which is provided with gudgeons 60 which are engaged in openings in ears 61, best shown in Figures 3 and 5, which extend from the lower end of the arcuate guide arm 46. Stop collars 62 and 63 are fixed to the feed screw above and below the nut 59. When the hand wheel is turned the nut 59 rocks on its gudgeon 60 to permit the feed screw to assume various angular positions as shown in Figures 3 and 5, or any intermediate angular position to permit the travelling nut 54 to rock the upper leaf downward and cant the saw 12 in the slot 11 in the table.

The saw may be adjusted to remain at all times parallel to the guides in the table whether it is in a plane perpendicular to the table or in a plane at an angle to the table. To adjust the saw parallel to the axis of the longitudinal hinge pintles 15 set secrews 64 are provided on each side of the end of the saw arbor nearest to the saw. These set screws are screwed into lugs 65 that are fastened to the lower leaf 19 on which the saw is mounted. The lugs on the end of the saw arbor nearest the saw are slotted in a line perpendicular to the saw as shown at 66 to receive the bolts 29 heretofore referred to. It is not necessary that these slots be very long because only a slight movement is necessary to bring the saw into alinement.

After the saw is alined parallel to the axis of the hinge pintles 15 it is then possible to make an alinement of the saw with the guides in the table top, not shown. For this purpose one of the hinge bars 17 that is disposed on the underside of the table is slotted in a line perpendicular to the saw or parallel to the axis of the shaft of the saw as shown at 67 to receive the bolts 18. An ear 68 is secured to the table top near the end of the bar and a set screw 69 is threaded through the ear and bears against an ear 70 on the bar. The other bar 17 is provided with a slot 71 to receive one of the bolts 18 so that the other bolt forms a pivot to permit fine adjustment of the saw when the set screw 69 is actuated.

Since the operation of the parts has been described as a description of the parts progressed, it is thought that the invention will be fully understood without further explanation.

What is claimed is:

1. A sawing machine of the character described, comprising a table having a vertical slot therein, an elongated upper plate hinged at one side to the bottom of the table at one side of the slot and having its pintles parallel with the slot, an arcuate guide arm connected at its upper end to the bottom surface of the table, means for adjusting the free edge of the upper plate and locking it on said arcuate guide, a lower plate pivoted to the end of the upper plate at the opposite end from the adjusting and locking means of the upper plate, an arcuate guide carried by the upper plate adjacent the adjusting and locking means of the upper plate, means for adjusting the free end of the lower plate and locking it on said arcuate guide, a saw shaft rotatably mounted on the lower plate, a saw carried by the shaft and extending through the vertical slot in the table, and a motor carried by the lower plate and driving the saw shaft, whereby the saw can be adjusted through the vertical slot to the desired height and at the desired angle.

2. A sawing machine of the character described, comprising a table having a vertical slot therein, an elongated upper plate hinged at one side to the bottom of the table at one side of the slot and having its pintles parallel with the slot, an arcuate guide arm connected at its upper end to the bottom of the table and having a slot therein and through which the free edge of the upper plate passes, means for adjusting and locking the free edge of the upper plate in its position in the slot in the arcuate guide, a lower plate pivoted to the end of the upper plate at the opposite end from the adjusting and locking means of the upper plate, an arcuate guide carried by the lower face of the upper plate adjacent the adjusting and locking means of the upper plate, said arcuate guide having a slot through which the free end of the lower plate passes, means for adjusting and locking the free end of the lower plate in the slot of the arcuate guide, a saw shaft rotatably mounted on the lower plate, a saw carried by the shaft and extending through the vertical slot in the table, and a motor carried by the lower plate and driving the saw shaft, whereby the saw can be adjusted through the vertical slot to the desired height and the desired angle.

3. A sawing machine of the character described, comprising a table having a vertical slot therein, an elongated upper plate hinged at one side to the bottom of the table at one side of the slot and having its pintles parallel with the slot, an arcuate guide arm connected at its upper end to the bottom of the table and having a slot therein and through which passes a member carried by the free edge of the upper plate, a threaded member journaled in the lower end of the arcuate guide arm, a pivoted nut carried by the upper plate and through which the threaded member passes, a handle for rotating said threaded member, a lower plate pivoted to the end of the upper plate at the opposite end from the adjusting and locking means of the upper plate, an arcuate guide carried by the lower face of the upper plate adjacent the adjusting and locking means of said plate, said arcuate guide having a slot through which a projection on the lower plate is guided, a threaded member journaled in the lower end of the second arcuate guide, a pivoted nut carried by the free end of the lower plate and through which the last mentioned threaded member is screwed, means for rotating said threaded member, a saw shaft rotatably mounted on the lower plate, a saw carried by the shaft and extending through the vertical slot in the table, and a motor carried by the lower plate and driving the saw shaft, whereby the saw can be adjusted through the vertical slot to the desired height and at the desired angle.

ELWYN A. EASTMAN.